(12) United States Patent
Nakamori et al.

(10) Patent No.: US 11,675,228 B2
(45) Date of Patent: Jun. 13, 2023

(54) ILLUMINATION DEVICE AND DISPLAY DEVICE

(71) Applicant: Japan Display Inc., Tokyo (JP)

(72) Inventors: Yosuke Nakamori, Tokyo (JP); Rina Yamamoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/704,144

(22) Filed: Mar. 25, 2022

(65) Prior Publication Data

US 2022/0317516 A1    Oct. 6, 2022

(30) Foreign Application Priority Data

Mar. 30, 2021 (JP) .............................. JP2021-057710

(51) Int. Cl.
 *G02F 1/13357* (2006.01)
 *G02F 1/1339* (2006.01)
 *G02F 1/1335* (2006.01)

(52) U.S. Cl.
 CPC ...... *G02F 1/133603* (2013.01); *G02F 1/1339* (2013.01); *G02F 1/133607* (2021.01)

(58) Field of Classification Search
 CPC ......... G02F 1/133603; G02F 1/133607; G02F 1/1339
 See application file for complete search history.

(56) References Cited

FOREIGN PATENT DOCUMENTS

| CN | 109597242 A | * | 4/2019 | ....... G02F 1/133603 |
| JP | 2020-205183 A | | 12/2020 | |
| WO | WO-2015098659 A1 | * | 7/2015 | ......... C09K 19/0216 |

OTHER PUBLICATIONS

Guo W, CN-206209253-U, May 2017 (Year: 2017).*

* cited by examiner

*Primary Examiner* — Mary Ellen Bowman
(74) *Attorney, Agent, or Firm* — Michael Best & Friedrich LLP (57) ABSTRACT

According to one embodiment, an illumination device includes a substrate, a plurality of light emitting elements mounted on the substrate, an optical sheet located on the light emitting elements, and a foam located between the light emitting elements and the optical sheet and overlapping the light emitting elements.

11 Claims, 6 Drawing Sheets

ILLUMINATION DEVICE AND DISPLAY DEVICE

CROSS-REFERENCE TO RELATED APPLICATIONS

This application is based upon and claims the benefit of priority from Japanese Patent Application No. 2021-057710, filed Mar. 30, 2021, the entire contents of which are incorporated herein by reference.

FIELD

Embodiments described herein relate generally to an illumination device and a display device including the illumination device.

BACKGROUND

A transmissive display device such as a liquid crystal display device includes an illumination device stacked on a display panel. As the illumination device, a side edge illumination device including a light guide opposed to the display panel, and light emitting elements arranged along the side surface of the light guide and a direct underneath illumination device including light emitting elements arranged directly below the display panel are known.

In the direct illumination device, light emitted from the light emitting elements, which serve as point light sources, needs to be diffused in order to convert the light into surface light sources. As a method of diffusing the light, there are technologies of providing a diffusion plate above the light emitting elements and providing an optical distance between the light emitting elements and an optical sheet disposed above the light emitting elements.

DETAILED DESCRIPTION

In general, according to one embodiment, an illumination device comprises a substrate, a plurality of light emitting elements mounted on the substrate an optical sheet located on the light emitting elements and a foam located between the light emitting elements and the optical sheet and overlapping the light emitting elements.

According to another embodiment, a display device comprises the illumination device, and a display panel stacked on the illumination device.

With the configuration described above, an illumination device capable of forming a uniform surface light source with stability can be provided, as can be a display device including the illumination device.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In the embodiments, a first direction X, a second direction Y and a third direction Z are defined as shown in the drawings. The first direction X, the second direction Y and the third direction Z are orthogonal to each other, but they may intersect at an angle other than 90 degrees. In the following descriptions, the third direction Z is referred to as "upward" or "above" and a direction opposite to the third direction Z is referred to as "downward" or "below". Further, such expressions "a second member above a first member" and "a second member below a first member", the second member may be in contact with the first member or may be remote from the first member. Further, viewing onto an X-Y plane defined by the first direction X and the second direction Y is referred to as planar view, whereas viewing onto an X-Z plane defined by the first direction X and the third direction Z is referred to as cross-sectional view.

Figure 1:
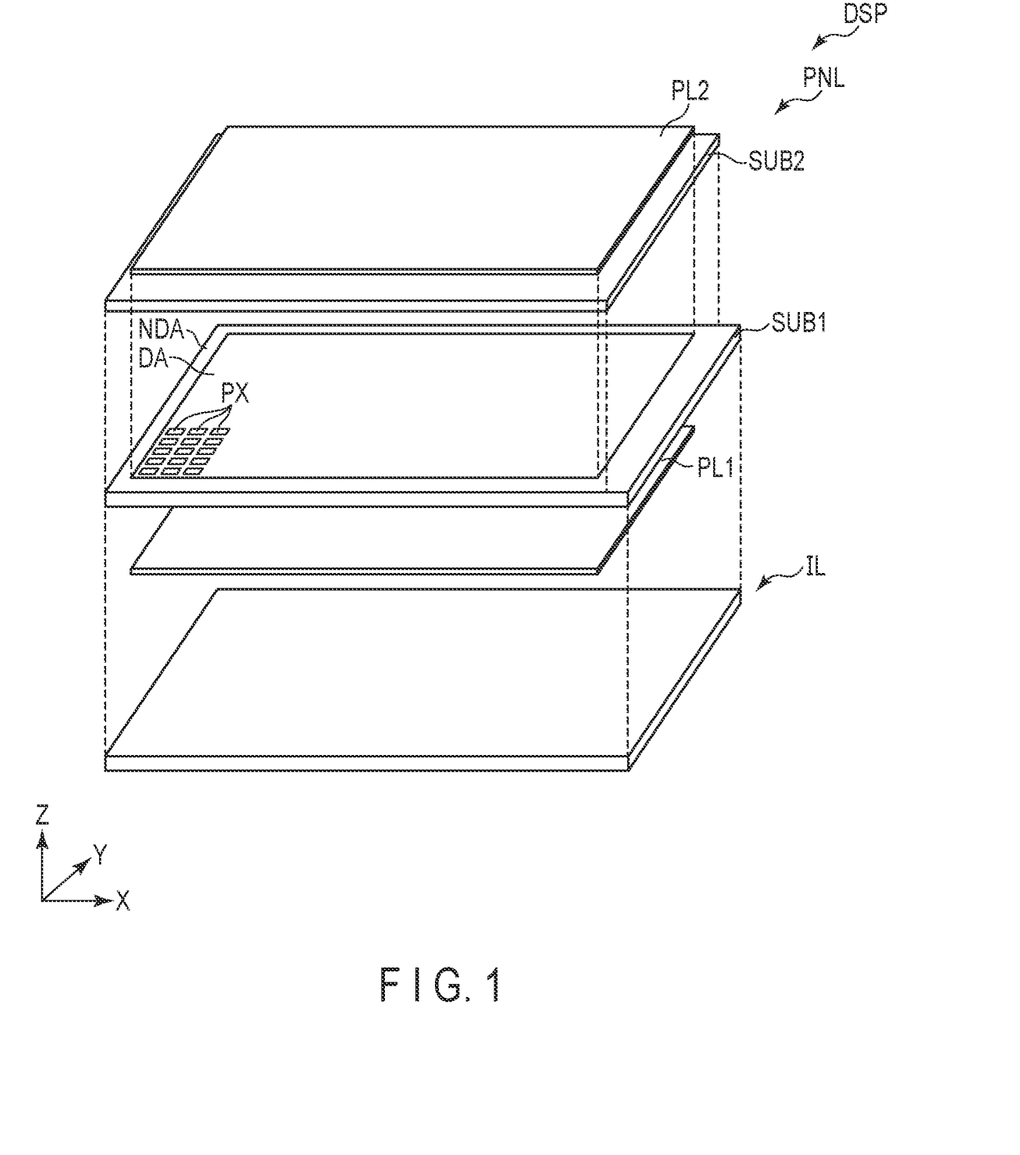
FIG. 1 is a schematic exploded perspective view of a display device according to an embodiment.

FIG. 1 is a schematic exploded perspective view of a display device DSP according to the present embodiment. The display device DSP includes an illumination device IL and a display panel PNL stacked on the illumination device IL in the third direction Z. In this embodiment, a liquid crystal display device is disclosed as an example of the display device DSP. The display panel PNL is, for example, a transmissive or semi-transmissive liquid crystal display panel. The display device DSP can be applied to various devices such as personal computers and monitors for vehicle-mounted devices.

The illumination device IL is provided immediately below the display panel PNL. From another viewpoint, the illumination device IL is opposed to the display panel PNL in the third direction Z. The illumination device IL emits light toward the display panel PNL to illuminate the display panel PNL. The illumination device IL functions as a backlight unit of the display device DSP.

The display panel PNL includes a first substrate SUB1, a second substrate SUB2 opposed to the first substrate SUB1, and a liquid crystal layer (not shown) located between the first and second substrates SUB1 and SUB2. The display panel PNL has a display area DA for displaying an image and a non-display area NDA around the display area DA. The first substrate SUB1 includes a plurality of pixels PX in the display area DA.

The pixels PX are arranged in a matrix in the first and second directions X and Y. The pixels PX contain, for example, red, green and blue sub-pixels. The sub-pixels each include a switching element, a pixel electrode connected to the switching element, and a common electrode opposed to the pixel electrode.

The display panel PNL further includes a first polarizer PL1 and a second polarizer PL2. The first polarizer PL1 is located on the lower surface of the first substrate SUB1, and the second polarizer PL2 is located on the upper surface side of the second substrate SUB2. The first and second polarizers PL1 and PL2 are stacked on the display area DA in the third direction Z.

The illumination device IL is configured to illuminate at least the entirety of the display area DA of the display panel PNL. The display panel PNL is configured to display an image by selectively transmitting light emitted from the illumination device IL.

Figure 2:
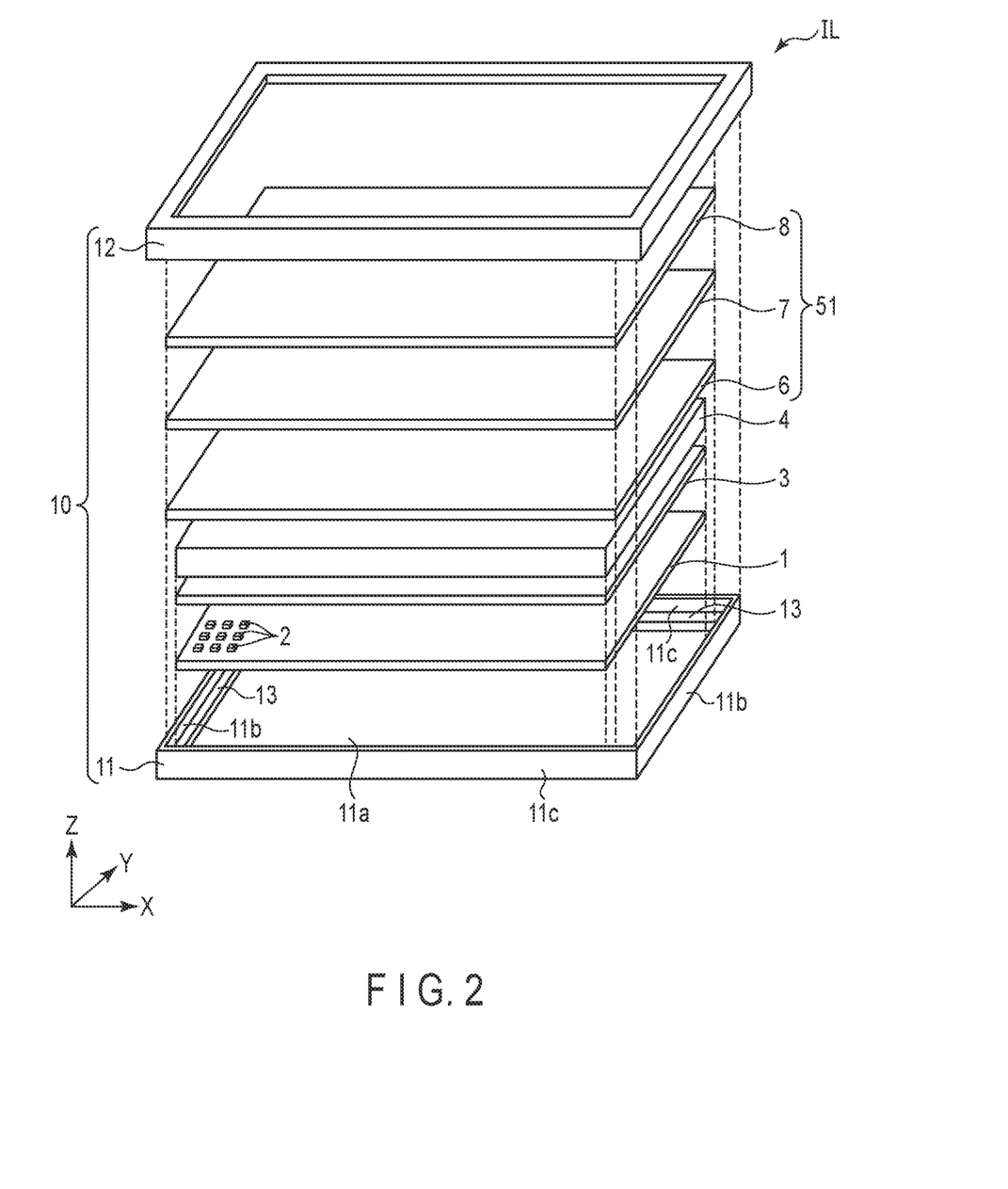
FIG. 2 is a schematic exploded perspective view of an illumination device according to the embodiment.

FIG. 2 is a schematic exploded perspective view of the illumination device IL according to the present embodiment. The illumination device IL includes a substrate 1, a plurality of light emitting elements 2 mounted on the substrate 1, an overcoat layer 3, a foam 4 and an optical sheet 51.

The light emitting elements 2 are provided in a matrix in the first and second directions X and Y, for example, on that surface of the substrate 1 which is opposed to the optical sheet 51. The distance (pitch) between adjacent light emitting elements 2 is determined optionally by the size of the display device DSP. The distance between adjacent light emitting elements 2 is, for example, 6 mm. The light emitting elements 2 need not be provided in a matrix but may be provided in a predetermined pattern. The optical sheet 51 is located above the light emitting elements 2. The foam 4 is interposed between the light emitting elements 2 and the optical sheet 51 and stacked on the light emitting elements 2. In other words, the foam 4 is located between the light emitting elements 2 and the optical sheet 51 and overlaps the light emitting elements 2.

The substrate 1, light emitting elements 2, overcoat layer 3, foam 4 and optical sheet 51 are housed in a housing 10. The housing 10 includes a rear bezel 11 and a front bezel 12 fitted into the rear bezel 11. The rear bezel 11 has a bottom plate 11a, a pair of side plates 11b extending in the second direction Y and aligned along the first direction X, and a pair of side plates 11c extending in the first direction X and aligned along the second direction Y.

The bottom plate 11a, side plates 11b and side plates 11c are formed integrally as a single unit. The side plates 11b and 11c are provided perpendicularly to the bottom plate 11a, for example. The rear bezel 11 and front bezel 12 are formed of metallic materials such as aluminum and stainless steel. The thickness of the bottom plate 11a is, for example, 1 mm or less. As an example, the thickness of the bottom plate 11a is 0.3 mm.

The substrate 1, overcoat layer 3, foam 4 and optical sheet 51 are stacked in this order on the rear bezel 11 in the third direction Z. The third direction Z coincides with the stacking direction of the substrate 1 and the optical sheet 51. The display panel PNL shown in FIG. 1 is bonded onto the front bezel 12 by an adhesive such as a double-faced tape.

The optical sheet 51 includes a wavelength conversion sheet 6, a prism sheet 7 and a polarizing sheet 8. These sheets 6, 7 and 8 are stacked in this order in the third direction Z. The optical sheet 51 may include a sheet other than the sheets 6, 7 and 8 and may not include at least one of the sheets 6, 7 and 8. The illumination device IL further includes a frame-like spacer 13 that is provided along the side plates 11b and 11c of the rear bezel 11.

Figure 3:
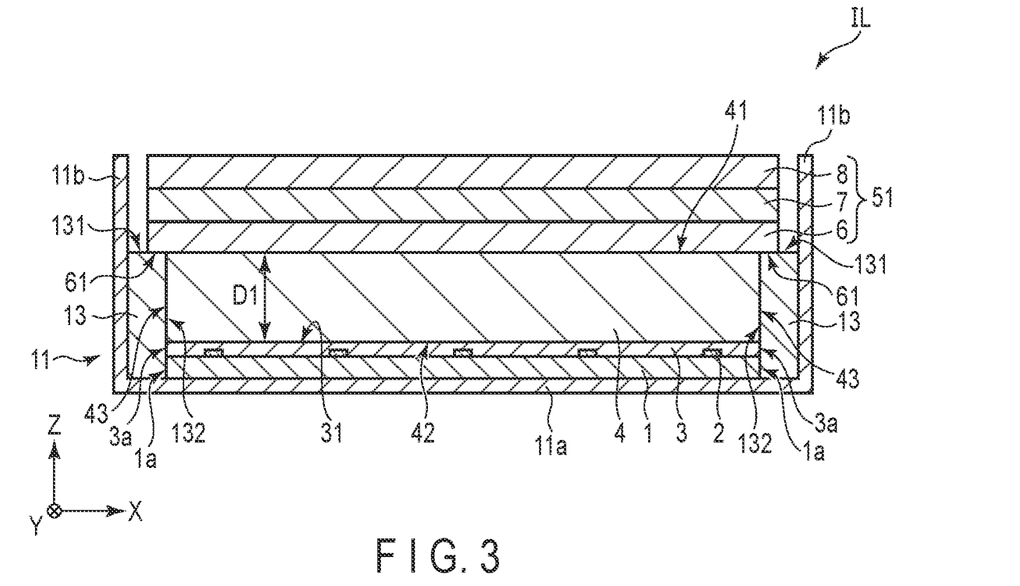
FIG. 3 is a schematic sectional view of the illumination device shown in FIG. 2.

FIG. 3 is a schematic sectional view of the illumination device IL shown in FIG. 2. In FIG. 3 and its subsequent drawings, the front bezel 12 is not shown. The substrate 1, light emitting elements 2, overcoat layer 3, foam 4 and optical sheet 51 are located between the paired side plates 11b in the first direction X. The side plates 11b are opposed to the side surfaces 1a of the substrate 1.

The substrate 1 is, for example, a flexible printed board or printed circuit board. The substrate 1 is located on the bottom plate 11a of the rear bezel 11. The substrate 1 is bonded to the bottom plate 11a by an adhesive such as a double-faced tape.

The light emitting elements 2 are mounted on the substrate 1. The light emitting elements 2 are, for example, light emitting diodes (LED). The light emitting elements 2 are each shaped like a rectangle whose longest side is, for example, 100 μm to 1 mm in length. As an example, the light emitting elements 2 are each shaped like a square of 300 μm×300 μm. The light emitting elements 2 each having such a size may be called a mini light emitting diode or a mini LED.

The overcoat layer 3 is provided on the substrate 1 to cover the light emitting elements 2. The overcoat layer 3 is in contact with the substrate 1 and the light emitting elements 2. The overcoat layer 3 has a thickness that is sufficient to cover the light emitting elements 2. The upper surface 31 of the overcoat layer 3 is flat.

For example, the lengths of the overcoat layer 3 in the first and second directions X and Y are approximately equal to their respective lengths of the substrate 1 in the first and second directions X and Y. In the example shown, the side surfaces 3a of the overcoat layer 3 coincides with the side surfaces 1a of the substrate 1 in the third direction Z. The overcoat layer 3 prevents the light emitting elements 2 from falling off from the substrate 1. The overcoat layer 3 transmits light, which is emitted from the light emitting elements 2, without converting the wavelength of the light into another wavelength.

The overcoat layer 3 is preferably formed of a material having a high transmittance to visible light. The overcoat layer 3 is thinner than the substrate 1, for example. As an example, when the thickness of the substrate 1 is 0.6 mm, the thickness of the overcoat layer 3 is 0.4 mm.

The foam 4 is located between the overcoat layer 3 and the optical sheet 51. The foam 4 is flat and includes a plurality of bubbles (see FIG. 8). The foam 4 has an upper surface 41 opposed to the optical sheet 51, a lower surface 42 located on the opposite side of the upper surface 41 and opposed to the overcoat layer 3, and side surfaces 43 connecting the upper surface 41 and the lower surface 42. In the example shown, the side surfaces 43 are opposed to the paired side plates 11b. From another viewpoint, the upper and lower surfaces 41 and 42 are parallel to the X-Y plane, and the side surfaces 43 is parallel to the Y-Z plane.

The foam 4 is located on at least the light emitting elements 2 mounted on the substrate 1 in the third direction Z. In the example shown, the foam 4 overlaps the entirety of the overcoat layer 3. In this case, the lengths of the foam 4 in the first and second directions X and Y are approximately equal to their respective lengths of the overcoat layer 3 in the first and second directions X and Y. In the example shown, the side surfaces 43 of the foam 4 coincide with the side surfaces 1a of the substrate 1 and the side surfaces 3a of the overcoat layer 3 in the third direction Z. The foam 4 may cover the light emitting elements 2 and may be shorter than the overcoat layer 3 in the first and second directions X and Y. In addition, the foam 4 may cover the light emitting elements 2 and may be longer than the overcoat layer 3 in the first and second directions X and Y.

The foam 4 is formed of a foaming material such as foamed plastics. As the foamed plastics, materials such as polyethylene, urethane, polypropylene, polystyrene and silicone resin are used.

The light incident on the foam 4 is repeatedly refracted, scattered and reflected when it passes through the bubbles of the foam 4. The light can thus travel while spreading in the foam 4. That is, the foam 4 has a function of diffusing the incident light. The optical sheet 51 does not have a diffusion plate, but when light emitted from the foam 4 passes through the optical sheet 51, a uniform surface light source is formed on the optical sheet 51.

The foam 4 is preferably resistant to temperature. Further, the foam 4 is preferably white or colorless and transparent in order to maintain the display quality of the display device DSP. Furthermore, the foam 4 preferably has strength that is sufficient to withstand the mass of the display panel PNL, the cover glass and the like, which are stacked on the illumination device IL.

The spacer 13 is interposed between the side plates 11b and the substrate 1. The spacer 13 is rectangular in sectional view. The spacer 13 has an upper surface 131 located on the opposite side of the bottom plate 11a and side surfaces 132 opposed to the side surfaces 43 of the foam 4. The spacer 13 is bonded to the rear bezel 11 by an adhesive such as double-faced tape.

The optical sheet 51 includes the above-described wavelength conversion sheet 6, prism sheet 7 and polarizing sheet 8. The wavelength conversion sheet 6 can absorb the light emitted from the light emitting elements 2 and convert it into light whose wavelength is longer than that of the absorbed light. The wavelength conversion sheet 6 is formed of, for example, a polymer material in which phosphors are dispersed. The wavelength conversion sheet 6 may contain quantum dots as light emitting materials.

The optical sheet 51 includes one prism sheet 7. The prism sheet 7 is located above the wavelength conversion sheet 6. The prism sheet 7 condenses light from the wavelength conversion sheet 6 and emits the light in the third direction Z. The prism sheet 7 includes a plurality of prisms arranged in parallel on its surface facing the polarizing sheet 8. The optical sheet 51 may include two prism sheets 7 such that the parallel prisms are orthogonal to each other.

The polarizing sheet 8 is located above the prism sheet 7. The polarizing sheet 8 is, for example, a reflective polarizing film. The polarizing sheet 8 emits only the light of light incident from the prism sheet 7 which is polarized in a predetermined direction in the third direction Z.

The optical sheet 51 is stacked on the spacer 13 in the third direction Z (stacking direction). On the other hand, none of the substrate 1, overcoat layer 3 and foam 4 is stacked on the spacer 13 in the third direction Z. The optical sheet 51 is bonded to the spacer 13. For example, the lower surface 61 of the wavelength conversion sheet 6 is bonded to the upper surface 131 of the spacer 13 by an adhesive such as a double-faced tape.

Since the optical sheet 51 is bonded to the spacer 13, a gap is formed as a fixed interval between the optical sheet 51 and the overcoat layer 3. The foam 4 is inserted into the gap. From another point of view, the overcoat layer 3 is not in contact with the optical sheet 51. In the present embodiment, a distance from the upper surface 31 of the overcoat layer 3 to the lower surface 61 of the wavelength conversion sheet 6 is defined as distance D1.

In the example shown, the upper surface 41 of the foam 4 is in contact with the lower surface 61 of the wavelength conversion sheet 6. The lower surface 42 of the foam 4 is in contact with the upper surface 31 of the overcoat layer 3. In this case, the height from the upper surface of the bottom plate 11a to the upper surface 41 of the foam 4 is approximately equal to the height from the upper surface of the bottom plate 11a to the upper surface 131 of the spacer 13.

When the foam 4 is in contact with the upper surface 31 of the overcoat layer 3 and the lower surface 61 of the wavelength conversion sheet 6, the thickness of the foam 4 is approximately equal to the distance D1. The distance D1 is held by the foam 4.

The foam 4 may be in contact with only one of the upper surface 31 of the overcoat layer 3 and the lower surface 61 of the wavelength conversion sheet 6, or may be in contact with neither of them. A gap may be formed between the foam 4 and the overcoat layer 3 and between the foam 4 and the wavelength conversion sheet 6. When the foam 4 is in contact with each of the overcoat layer 3 and optical sheet 51, it can inhibit the optical sheet 51, the rear bezel 11, etc., from being deformed.

The foam 4 is connected to the spacer 13. For example, the side surfaces 43 of the foam 4 are bonded to the side surfaces 132 of the spacer 13 by an adhesive such as a resin material and a double-faced tape. The adhesive is provided between the side surfaces 43 of the foam 4 and the side surfaces 132 of the spacer 13. In this case, at least one of the side surfaces 43 has only to be bonded to the spacer 13.

In the example shown, the foam 4 is thicker than the bottom plate 11a, substrate 1, overcoat layer 3, wavelength conversion sheet 6, prism sheet 7 and polarizing sheet 8. The thickness of the foam 4 is, for example, in the range of 1 mm to 5 mm. In the case of the foam 4 having the foregoing thickness, the light incident on the foam 4 is spread sufficiently in the foam 4 and emitted toward the optical sheet 51.

Figure 4:
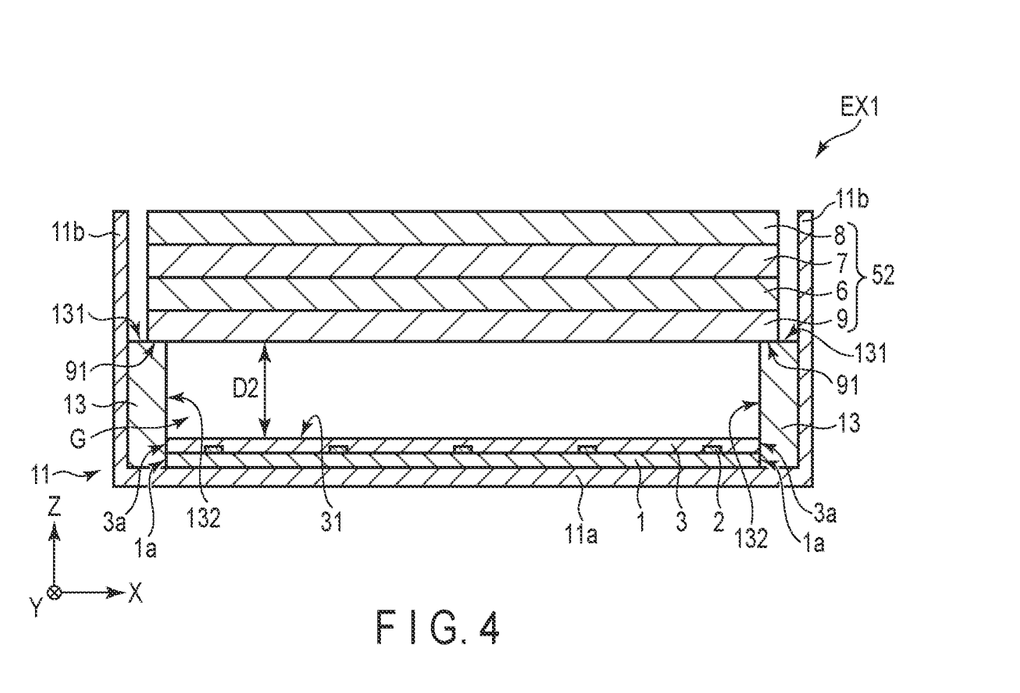
FIG. 4 is a schematic sectional view showing a comparative example of the illumination device.

FIG. 4 is a schematic sectional view showing a comparative example EX1 of the illumination device IL. The comparative example EX1 does not include the foam 4 between the overcoat layer 3 and the optical sheet 52. In the comparative example EX1, a gap G is formed between the overcoat layer 3 and the optical sheet 52. The gap G is, for example, an air layer.

The optical sheet 52 in the comparative example EX1 further includes a diffusion plate 9. The diffusion plate 9 is located at the lowermost part of the optical sheet 52 and between the overcoat layer 3 and the wavelength conversion sheet 6. The lower surface 91 of the diffusion plate 9 is bonded to the upper surface 131 of the spacer 13 by an adhesive such as a double-faced tape. The diffusion plate 9 diffuses the light emitted from the light emitting elements 2 and emits the light toward the wavelength conversion sheet 6.

The optical sheet 52 and the spacer 13 are bonded together to hold a distance D2 from the upper surface 31 of the overcoat layer 3 to the lower surface 91 of the diffusion plate 9. In order to sufficiently spread the light emitted from the light emitting elements 2 before entering the diffusion plate 9, the distance D2 needs to be secured sufficiently. The distance D2 is longer than the distance D1 in the illumination device IL. From another point of view, the distance D2 is greater than the thickness of the foam 4 in FIG. 3.

Figure 5:
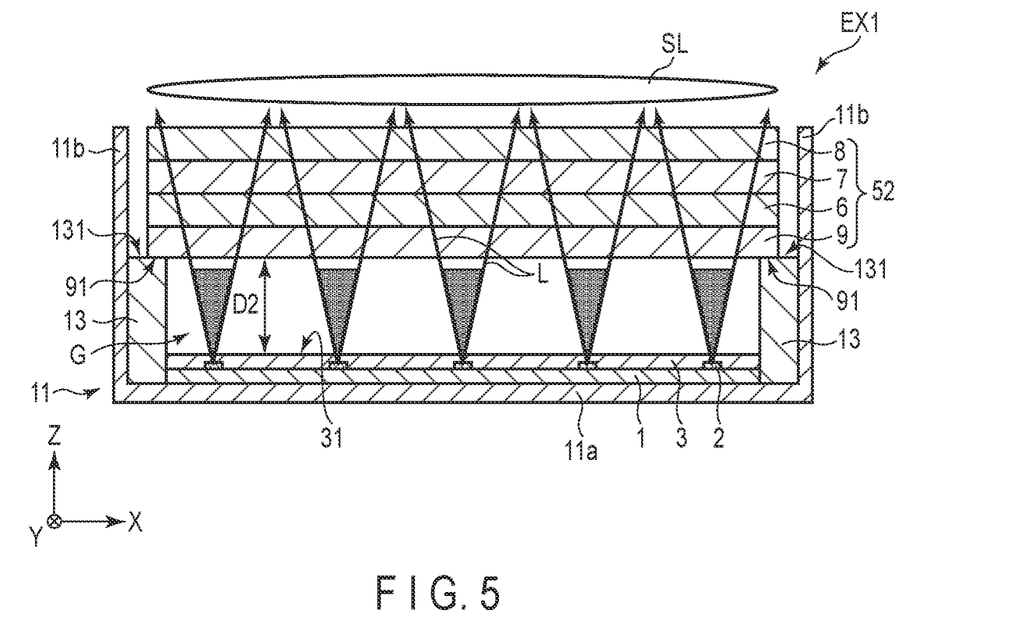
FIG. 5 is a schematic view showing a surface light source formed in the comparative example.
Figure 6:
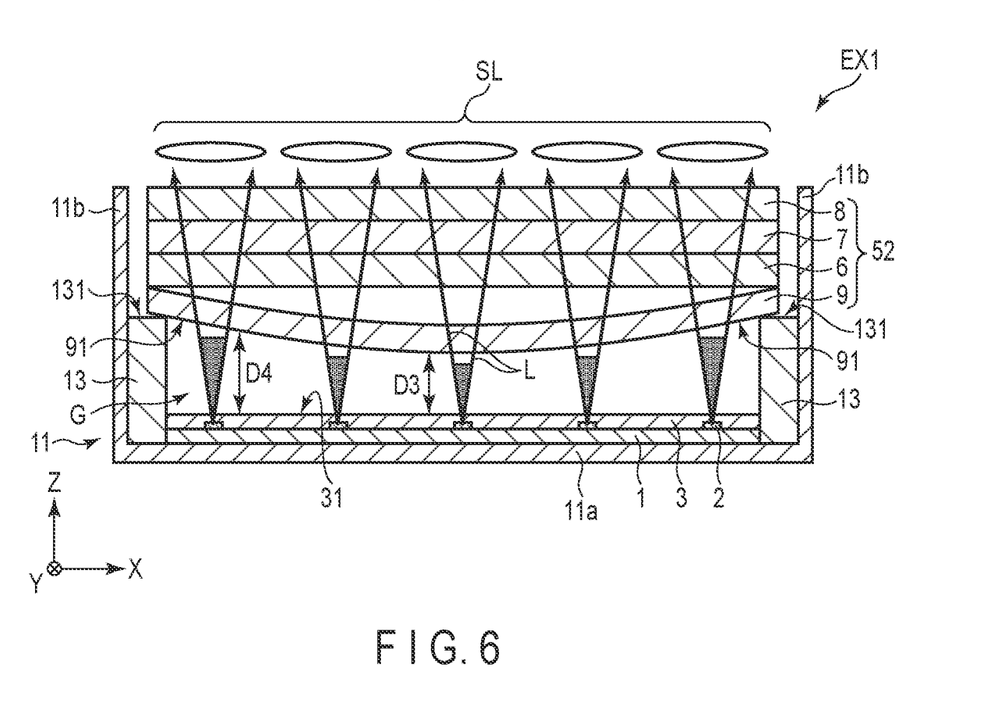
FIG. 6 is a schematic view showing a surface light source formed in the comparative example.

FIGS. 5 and 6 are schematic views each showing a surface light source SL formed in the comparative example EX1. In FIG. 5, an appropriate distance is secured in the gap G to spreading the light emitted from the light emitting elements 2. In this case, light L emitted from the light emitting elements 2 is spread sufficiently in the gap G before entering the diffusion plate 9. When the light L spread in the gap G enters the diffuser plate 9 and passes through the wavelength conversion sheet 6, prism sheet 7 and polarizing sheet 8 in this order, a uniform surface light source SL is formed on the optical sheet 52.

The diffusion plate 9 may be deformed by changes in ambient temperature, vibration during transportation, dead weight, external force during assembly, and the like. When the diffusion plate 9 is deformed, the distance D2 may not be held properly in the gap G.

In FIG. 6, the diffusion plate 9 is deformed toward the substrate 1. In this case, a distance D3 from the upper surface 31 of the overcoat layer 3 to the lower surface 91 of the diffusion plate 9 in the central part of the comparative example EX1 is smaller than the distance D2 in FIG. 6, as is a distance D4 from the upper surface 31 of the overcoat layer 3 to the lower surface 91 of the diffusion plate 9 in part closer to the side plates 11b. Since the amount of deformation of the diffusion plate 9 in the third direction Z in the central part is larger than that in the part closer to the side plate 11b, the distance D3 is smaller than the distance D4.

When the diffusion plate 9 is deformed, the light L emitted from the light emitting elements 2 hardly spreads in the gap G before entering the diffusion plate 9. When the light L enters the diffusion plate 9 without sufficiently spreading, a uniform surface light source SL becomes difficult to form on the optical sheet 52. Insufficient spread of light in the gap G may cause the display quality of the display device DSP to lower. FIG. 6 shows an example in which the diffusion plate 9 is deformed, but the bottom plate 11a of the rear bezel 11 may be deformed toward the diffusion plate 9 to make the gap G uneven.

The diffusion plate 9 and the rear bezel 11 are easily deformed in a direction in which the distance from the upper surface 31 of the overcoat layer 3 to the lower surface 91 of the diffusion plate 9 decreases. As the size of the illumination device increases, it becomes more difficult to appropriately maintain the distance from the upper surface 31 of the overcoat layer 3 to the lower surface 91 of the diffusion plate 9. In addition, when the distance D2 is appropriately secured on the assumption that the diffusion plate 9 and the rear bezel 11 are deformed, the illumination device is thickened.

Figure 7:
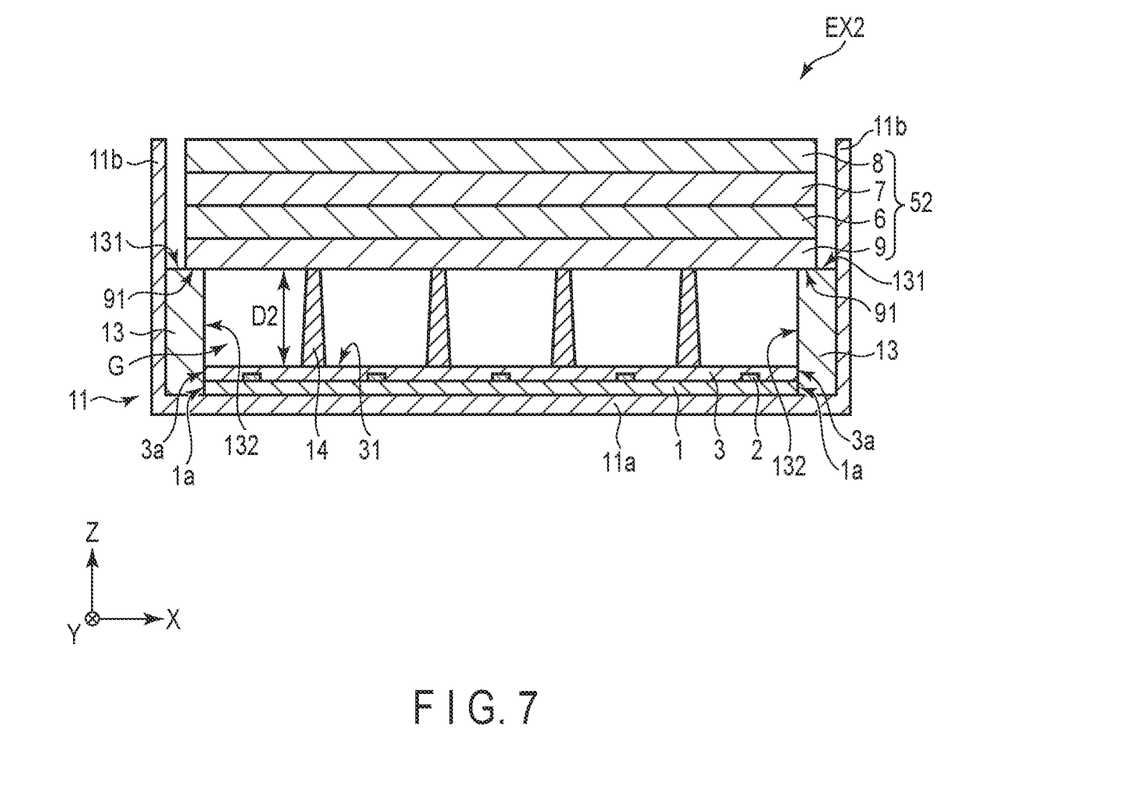
FIG. 7 is a schematic sectional view showing another comparative example of the illumination device.

FIG. 7 is a schematic sectional view showing another comparative example EX2 of the illumination device IL. In addition to the configuration of the comparative example EX1, the comparative example EX2 further includes a sub-spacer 14 in the gap G.

The sub-spacer 14 is provided so as not to overlap with the light emitting elements 2 in a planar view, for example. The sub-spacer 14 is columnar, and extends, for example, from the upper surface 31 of the overcoat layer 3 toward the lower surface 91 of the diffusion plate 9 such that its cross-sectional area is reduced in the X-Y plane. The sub-spacer 14 has a function of holding the distance D2 as a support and a function of a reflector plate. Providing the sub-spacer 14 in the gap G makes it easy to hold the distance D2 as an appropriate one.

If the sub-spacer 14 is provided, the display quality of the display device DSP is likely to be affected by the shape, size, location, etc., of the sub-spacer 14, such as the shadow of the sub-spacer 14 being displayed when the illumination device IL is turned on. Since, furthermore, the distance (pitch) between adjacent light emitting elements 2 depends on the minimum processing size of the sub-spacer 14, it may be difficult to make the distance narrower than the minimum processing size.

In the illumination device IL of the present embodiment, the foam 4 is provided between the overcoat layer 3 and the optical sheet 51. Thus, the optical sheet 51 and the rear bezel 11 can be inhibited from being deformed to hold the distance D1 as an appropriate one, without providing the sub-spacer 14.

Figure 8:
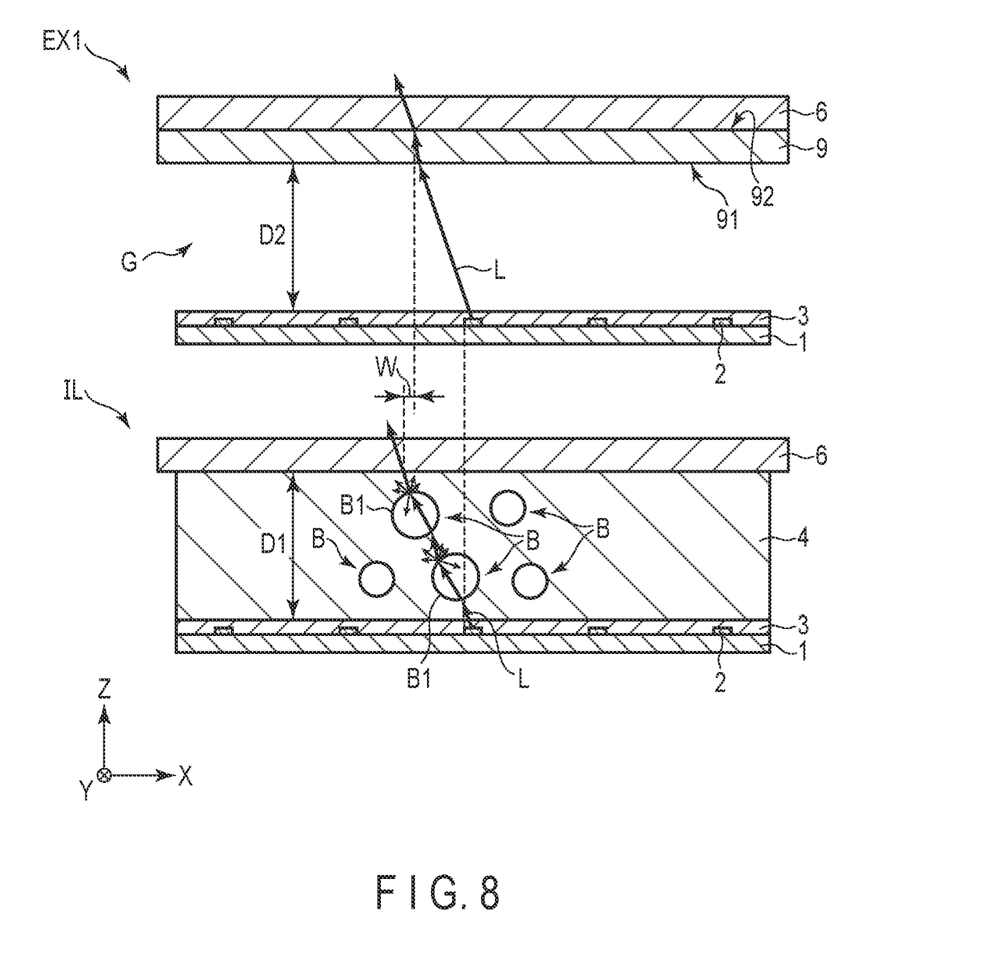
FIG. 8 is a schematic view showing how light travels in the illumination device and the comparative example.

FIG. 8 is a schematic diagram showing how light travels in the illumination device IL and the comparative example EX1. In FIG. 8, the rear bezel 11 is not shown. In FIG. 8, distance D1 is equal to distance D2. In the comparative example EX1, when light L reaches the diffusion plate 9 from the light emitting element 2, it is refracted once and then spreads. When the light L is emitted from the diffusion plate 9, it is also refracted and spreads, and then enters the wavelength conversion sheet 6. In the comparative example EX1, the light L emitted from the light emitting elements 2 spreads twice at the maximum when it passes through the diffusion plate 9.

In the illumination device IL, the light L emitted from the light emitting element 2 is repeatedly refracted, scattered and reflected at a boundary B1 between the bubbles B of the foam 4 and the other portions when it passes through the bubbles B, and then spreads in the foam 4. The higher the density of bubbles B in the foam 4, the larger the number of bubbles B through which the light L passes. The light L spreads in the foam 4 in accordance with the number of bubbles B through which the light L passes.

As to how the light L emitted from the light emitting element 2 at the same position in the first direction X, as compared with the comparative example EX1, the illumination device IL including the foam 4 can spread the light L by an amount corresponding to the width W before the light enters the wavelength conversion sheet 6.

From another viewpoint, in the case of the illumination device IL, the distance D1 can be made shorter than the distance D2 in order to obtain the same light spread as that in the comparative example EX1. That is, the thickness of the foam 4 can be made smaller than the distance D2.

For example, the comparative example EX1 includes an optical sheet 52 having a diffusion plate 9 having a thickness of 1 mm, and the distance D2 is 4.3 mm. On the other hand, the illumination device IL includes a foam 4 having a thickness of 2.53 mm and an optical sheet 51 having no diffusion plate. Comparing the thickness of the illumination device IL and that of the comparative example EX1, the illumination device IL is 2.77 mm thinner than the comparative example EX1.

The embodiment described above makes it possible to provide an illumination device IL capable of forming a uniform surface light source with stability, and a display device DSP including the illumination device IL. That is, the foam 4 inserted between the overcoat layer 3 and the optical sheet 51 makes it possible to inhibit the optical sheet 51, the rear bezel 11 and the like from being deformed and maintain the distance from the light emitting elements 2 to the optical sheet 51. Accordingly, a uniform surface light source can be formed on the optical sheet 51 with stability by the light emitted from the light emitting elements 2.

Since the foam 4 diffuses the incident light, the optical sheet 51 has no diffusing plate. In the illumination device IL, the distance from the upper surface 31 of the overcoat layer 3 to the lower surface 61 of the wavelength conversion sheet 6 can be made smaller than that in the comparative examples EX1 and EX2 shown in FIGS. 4 and 7. Thus, the illumination device IL can be thinned.

The illuminator IL includes no equivalent for the sub-spacer 14 shown in FIG. 7. Thus, the light emitting elements 2 can be arranged at narrow pitches on the substrate 1. For example, more segments provided with the light emitting elements 2 can be formed in a matrix on the substrate 1.

Since, furthermore, the distance between adjacent light emitting elements 2 is narrowed, the range in which the light emitted from the light emitting elements 2 needs to spread is narrowed and thus the foam 4 can be thinned further. In addition, the manufacture of the sub-spacer 14 shown in FIG. 7 requires costs for manufacturing a molding die, but such a molding die is not required in the present embodiment. It is therefore possible to suppress the costs for manufacturing the illumination device IL and the display device DSP.

Note that the display device DSP of the present embodiment may further include a touch sensor. For example, the touch sensor may be provided to overlap the display panel PNL and may be integrated with the display panel PNL as one unit.

In the present embodiment, the spacer 13 is provided like a frame, but at least one spacer 13 has only to be provided between the substrate 1 and the side plates 11b and 11c and along one of the side plates 11b and 11c. The spacer 13 is shaped like a rectangle in a sectional view, but may be shaped like a step and, in this case, the spacer 13 has a plurality of surfaces parallel to the upper surface of the bottom plate 11a which are different in position in the third direction Z. The sheets 6, 7 and 8 of the optical sheet 51 may be bonded to their respective surfaces of the spacer 13 by an adhesive.

In the present embodiment, the illumination device IL includes the overcoat layer 3, but may not include it. When the overcoat layer 3 is not provided on the substrate 1, the lower surface 42 of the foam 4 may be in contact with the light emitting elements 2. In addition, a gap may be formed between the lower surface 42 of the foam 4 and the light emitting elements 2.

Based on the illumination device and the display device which have been described in the above-described embodiments, a person having ordinary skill in the art may achieve an illumination device and a display device with an arbitral design change; however, as long as they fall within the scope and spirit of the present invention, such an illumination device and such a display device shall be encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:

1. An illumination device comprising:
a substrate;
a plurality of light emitting elements mounted on the substrate;
an optical sheet located on the light emitting elements;
a foam located between the light emitting elements and the optical sheet and overlapping the light emitting elements; and
an overcoat layer which is provided on the substrate and covers the light emitting elements, wherein
the foam is in contact with the overcoat layer, and a lower surface of the foam extends to overlap at least two light emitting elements in a plan view and forms an interface between the foam and the overcoat layer, and
the optical sheet does not include a diffusion plate.

2. The illumination device of claim 1, wherein the foam is in contact with the optical sheet.

3. The illumination device of claim 1, wherein the optical sheet includes at least one of a polarizing sheet, a prism sheet, and a wavelength conversion sheet.

4. The illumination device of claim 1, wherein the foam is thicker than the substrate.

5. The illumination device of claim 1, further comprising:
a spacer; and
a housing which houses the substrate, the optical sheet, the foam, and the spacer,
wherein:
the housing has a side plate opposed to a side surface of the substrate;
the spacer is provided between the side plate and the substrate; and
the spacer has a side surface opposed to a side surface of the foam.

6. The illumination device of claim 5, wherein the side surfaces of the foam are bonded to the side surfaces of the spacer by an adhesive.

7. The illumination device of claim 5, wherein the optical sheet overlaps the spacer in a stacking direction of the substrate and the optical sheet.

8. The illumination device of claim 5, wherein the optical sheet is bonded to the spacer.

9. The illumination device of claim 1, wherein the foam is formed of foamed plastics.

10. The illumination device of claim 1, wherein each of the light emitting elements includes an LED.

11. A display device comprising:
the illumination device of claim 1; and
a display panel stacked on the illumination device.

* * * * *